United States Patent [19]

Brown

[11] Patent Number: 4,977,974
[45] Date of Patent: Dec. 18, 1990

[54] LOCKING DEVICE FOR AUTOMOBILES

[76] Inventor: Edward E. Brown, 2438 Catacombs, New Caney, Tex. 77357

[21] Appl. No.: 294,789

[22] Filed: Jan. 9, 1989

[51] Int. Cl.$^5$ ............................................. B60R 25/02
[52] U.S. Cl. ..................................... 70/226; 180/287
[58] Field of Search ................. 180/287; 70/225, 226, 70/233

[56] References Cited

U.S. PATENT DOCUMENTS

| 1,440,278 | 12/1922 | Chochol | 70/226 |
|---|---|---|---|
| 1,453,497 | 5/1923 | Farlow | 70/226 |
| 4,651,849 | 3/1987 | Givati | 180/287 |
| 4,699,238 | 10/1987 | Tamir | 180/287 |

*Primary Examiner*—Richard A. Bertsch
*Attorney, Agent, or Firm*—Dodge Bush & Moseley

[57] ABSTRACT

A locking device (22) for an automobile (10) mounted externally on the automobile frame (12) has an elongate tubular support (24) in axial alignment with a front wheel (15) of the automobile. A locking bar (50) is mounted in telescoping relation witin the tubular support (24) for relative sliding movement between a retracted inoperable position as shown in FIGS. 3 and 4 and an extended operable position as shown in FIGS. 1 and 2. The wheel (15) is turned prior to the extension of the locking member (50), and upon extension the locking member (50), extends alongside the wheel (15) to block return of the wheel (15) to a straight position and block movement of the automobile (10) in a straight path. A lock (42) locks the locking bar (50) in extended position and maintains the locking bar (50) in such locked position upon manually unlocked by a key.

5 Claims, 1 Drawing Sheet

LOCKING DEVICE FOR AUTOMOBILES

BACKGROUND OF THE INVENTION

This invention relates to a locking device for automobiles, and more particularly to such a locking device adapted to be mounted on the automobile frame beneath the front door for actuation by the driver of the automobile.

Heretofore, various devices have been provided to prevent the theft of automobiles. Such devices have included locking mechanisms for preventing the normal rotation of the wheels on their axles, such as, for example, as shown in U.S. Pat. No. 1,589,233 dated June 14, 1926; U.S. Pat. No. 1,443,009 dated Jan. 23, 1923 and U.S. Pat. No. 1,943,216 dated Jan. 9, 1934. Likewise, U.S. Pat. No. 4,034,824 dated July 12, 1977 shows a wheel lock assembly for locking wheels against rotation, and U.S. Pat. No. 4,651,849 dated Mar. 24, 1987 shows a locking device fitting over a tire for continually gripping the tire. Other locking devices for automobiles have locked the steering mechanisms and starting crank against operation.

Thus, such prior art locking devices have been relatively complex both in operation, such as being provided for all or at least two of the wheels, and in the setting or actuation of the locking mechanism. Much of the complexity has resulted from the mechanisms for preventing the rotation of the wheels about their axles since the wheels are engaged in most instances by friction devices to prevent such rotation. Such friction devices require substantial frictional contact with the tires and must be adapted to fit tires or wheels of various sizes.

SUMMARY OF THE INVENTION

The present invention is directed to a relatively simple locking device for automobiles which locks a single wheel in a position turned from a straight forward direction thereby to prevent movement of the automobile in a straight direction. The locking device does not prevent rotation of the wheel on its axle but merely restricts a wheel from being moved or rotated in a straight forward direction. Prior to application of the locking device, the wheel is first turned to a predetermined angle from its normal straight forward position. Then the locking device is applied with a locking member being extended into contact with a side of the wheel preventing return of the wheel to its straight position. Thus, if the automobile is towed or driven, the automobile will move in a circular path preventing any substantial movement of the automobile away from its original location.

Since only the front wheels of an automobile are normally steered or turned away from a straight forward position, the present invention is particularly adapted for use with the front wheels. Further, since it is only necessary to prevent turning of only one wheel to a straight position, the invention is normally used only against the wheel on the side of the driver so that it may be easily accessible for operation by the driver.

The locking device of this invention is formed of an elongate compact structure for being easily mounted on the frame of the automobile beneath the door on the driver's side and extending in a direction toward the front wheel. The locking member is movable between a retracted inoperable position out of contact with the wheel, and an extended operable position adjacent a side of the wheel which has been turned. The wheel is prevented from being returned to a straight position by contact with the extended locking member.

The locking member may be moved manually into extended locking position by the driver while seated in the automobile with the door open. After movement to the extended position, the lock is manually depressed to lock the locking member in extended position. For unlocking and releasing the locking member from extended locked position, a key is manually inserted within the lock for unlocking the locking member which is then spring urged to its retracted inoperable position.

It is an object of this invention to provide a locking device for an automobile which is adapted to prevent the turning of a wheel to a straight forward position.

It is a further object of the invention to provide such a locking device for an automobile which is formed of an elongate compact structure for external mounting to the automobile frame beneath the front door on the driver's side of the automobile and for external actuation by the driver upon opening of the door.

Another object of the invention is to provide such a locking device having a locking member movable between a retracted inoperable position and an extended operable position adjacent the side of the wheel which has been turned from a straight direction thereby to prevent return of the wheel to a straight direction.

Other objects, features and advantages of this invention will become more apparent after referring to the following specification and drawings.

DESCRIPTION OF THE INVENTION

Figure 1:
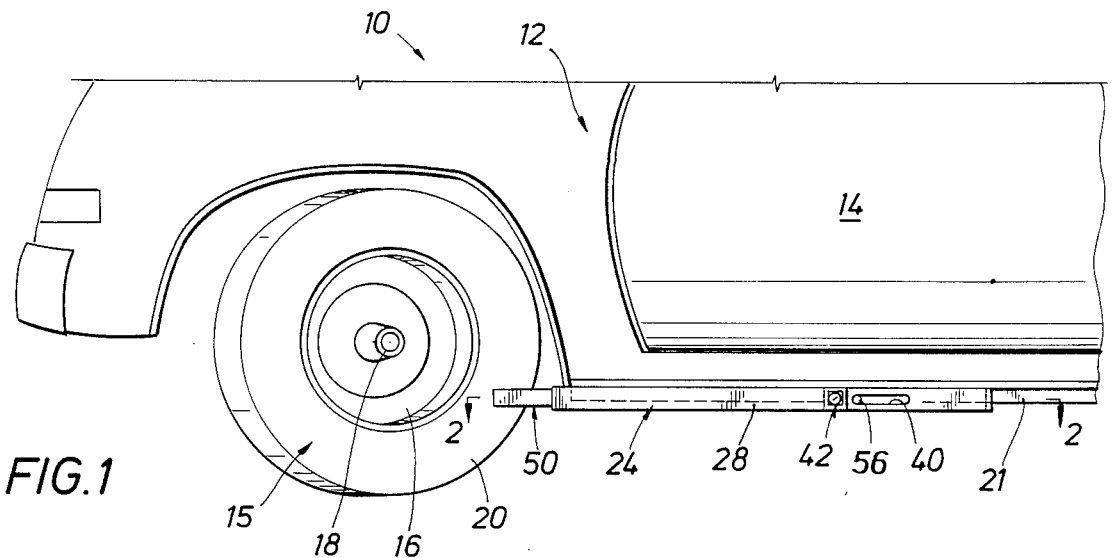
FIG. 1 is a partial side elevation of an automobile having the locking device of the present invention mounted on the automobile frame beneath the front door and shown in an extended operable position with the locking member positioned adjacent a side of the wheel turned from a straight forward direction.

Referring now to the drawings for a better understanding of this invention, an automobile is shown partially at 10 having a body frame 12 and a front door 14. A front wheel shown generally at 15 includes a hub 16 mounted for rotation about an axle 18 and a tire 20 mounted about hub 16. A lip or extension 21 extends downwardly from the underside of frame 12 adjacent door 14. The driver of the automobile is seated on the front seat (not shown) adjacent door 14.

The locking device comprising the present invention is shown generally at 22 and is mounted on frame 12 beneath door 14 so that it may be accessible to the driver of automobile 10 when seated therein with front door 14 open. The driver may reach locking device 22 with the door open by leaning outwardly and reaching downwardly. Locking device 22 has an outer tubular support or body 24 of a hollow rectangular cross section to define an upper horizontal side 26, an outer vertical side 28, an opposed inner vertical side 30, and a lower horizontal side 32. For mounting locking device 22 on automobile frame 12, a plurality of bolts 34 are secured to inner side 30 and extend horizontally therefrom for fitting within aligned openings of extension 21 on body frame 12. Nuts 36 are threaded onto bolts 34 for securing locking device 22 adjacent the lower end of front door 14. An elongate slot 40 is provided in outer vertical side 28. A lock shown generally at 42 is received within a protective tubular housing 41 of a generally rectangular cross section and welded to side 28 at 43 adjacent slot 40. Tubular support 24 has an open end at 44 and an opposed end 46 closed by a plug 48 press fitted within the end of tubular support 24.

Figure 2:
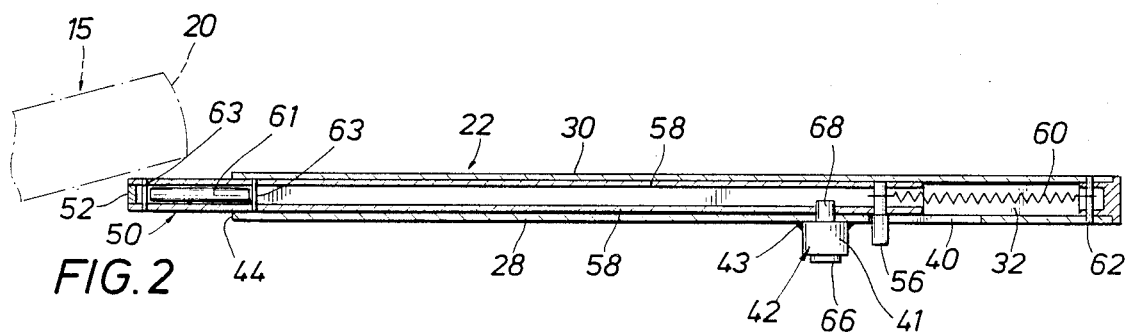
FIG. 2 is a longitudinal section of the locking device of FIG. 1 taken generally along line 2—2 of FIG. 1 with the locking member in extended locked position.
Figure 3:
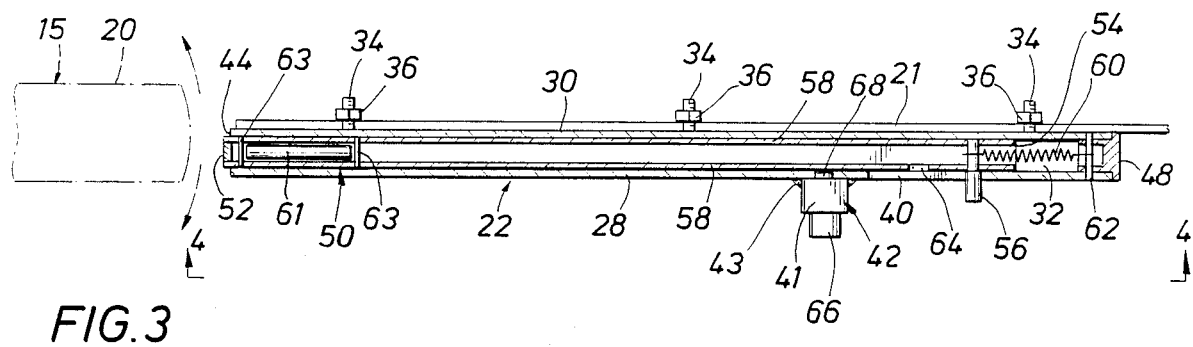
FIG. 3 is a longitudinal section of the locking device similar to FIG. 2 but showing the locking device in a retracted inoperable position.
Figure 4:
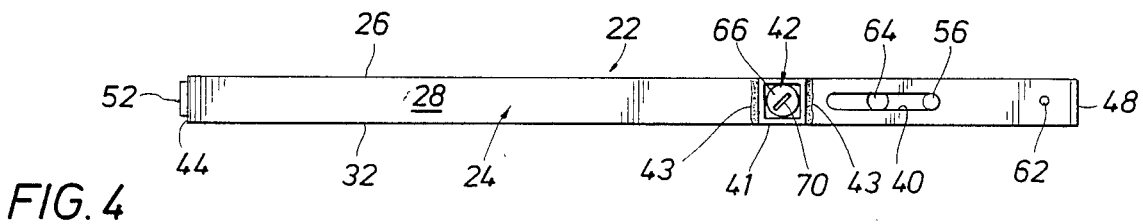
FIG. 4 is a side elevation of the locking device in retracted position looking generally along line 4—4 of FIG. 3 and showing the locking device mounted on the automobile frame beneath the front door.

Mounted within outer tubular member 24 and extending from open end 44 thereof is a tubular locking bar 50 of a rectangular cross section with one end 52 closed and the opposite end 54 being open. Locking bar 50 is mounted for relative sliding movement within tubular support 24 between a retracted inoperable position as shown in FIGS. 3 and 4, and an extended operable position as shown in FIGS. 1 and 2 for releasably holding wheel 15 in a turned position. A detent 56 is secured to opposed vertical sides 58 of locking bar 50 and extends within elongate slot 40 for movement between the ends of slot 40 which form stops for detent 56 and locking bar 50. A tension spring 60 is biased between detent 56 and a pin 62 secured between sides 28 and 30 of tubular support 24 for continuously urging locking bar 50 to a retracted inoperable position with detent 56 in engagement with one end of slot 40. To prevent possible sawing of locking bar 50, a floating steel bar 61 is mounted within hollow locking bar 50 between pins 63.

Vertical side 58 of locking bar 50 adjacent lock 42 has an opening 64 therein. Lock 42 includes a manually depressible plunger 66 which actuates a pin 68 for movement within opening 64 when opening 64 is aligned or registers with pin 68 in the extended piston of locking bar 50 with pin 56 engaging an opposite end of elongate slot 40. After movement of slidable bar 50 to extended position and manual depression of plunger 66 to the position of FIG. 2, lock 42 is locked and may be released only by a key which is insertable within a key slot opening 70 of plunger 66. Lock 42 is a plunger type lock such as sold under model no. G2139 by Hudson Lock, Inc. Hudson, Mass.

In operation, the steering wheel of the automobile is turned by the driver to turn wheel 15 a predetermined amount as shown in FIG. 2 in order to permit the full extension of locking bar 50. In the normal straight forward direction of wheel 15 as shown in broken lines in FIG. 3, tire 20 of wheel 15 is aligned with the longitudinal axis of elongate locking device 22. After turning of wheel 15 and tire 20, the driver of the automobile opens door 14 and manually grips detent 56 to move locking bar 50 to the extended position alongside wheel 15 as shown in FIGS. 1 and 2 with detent 56 engaging the end of slot 40. In this position, plunger 66 is manually depressed with pin 68 received within opening 64 to lock locking bar 50 in position. With the front wheels of the automobile blocked by locking bar 50 against return to a straight position, automobile 10 may move only in a circle or a circular path. To release locking bar 50, a key is manually inserted within key opening 70 and rotated to release pin 68 from opening 64. Then, spring 60 returns locking bar 50 to the retracted inoperable position of FIGS. 3 and 4.

It is to be understood that wheel 15 may be turned either right or left from a straight position. Thus, a simple locking device utilizing a minimum of parts has been provided which is easily moved into a locked position by a driver of an automobile without leaving the seat of the automobile. Since the wheels of the automobile are not prevented from being rotated, the simple projection of a single locking bar from an externally mounted locking device is effective to prevent theft of the automobile.

The term automobile as used in the specification and claims herein is interpreted as including other roadway vehicles, such as trucks, vans, and the like.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A releasable securing device for holding an automobile front wheel including a tire thereon in a turned position to prevent steering of the automobile by contact with a side of the tire and adapted to be mounted on the automobile frame adjacent the wheel; said releasable securing device comprising;

an elongate support secured to the automobile frame subjacent a front door thereof;

an elongate securing bar mounted on said elongate support for relative sliding movement between a retracted inoperable position out of contact with said tire and an extended operable position alongside a side of the tire after the wheel is turned a predetermined amount from a straight forward direction thereby to block return of the wheel to a straight position; and manually operable means to releasable secure the securing bar in extended position alongside a side of the front wheel thereby to prevent normal movement of the automobile in a straight direction;

said elongate support being a tubular member receiving said elongate securing bar in telescoping relation and having a longitudinally extending elongate slot therein, said securing bar having a detent projecting therefrom and received within said slot for relative sliding movement between retracted and extended positions of said securing bar.

2. A releasable securing device for holding an automobile wheel in a turned position as set forth in claim 1 wherein said elongate support and said securing bar are each of a hollow rectangular cross section, sand means for continuously urging said securing bar to a retracted position within said elongate support.

3. A releasable securing device for holding an automobile front wheel including a tire thereon in a turned position to prevent steering of the automobile by contact with a side of the tire and adapted to be mounted on the automobile frame adjacent the wheel; said releasable securing device comprising;

an elongate support secured to the automobile frame subjacent a front door thereof;

an elongate securing bar mounted on said elongate support for relative sliding movement between a retracted inoperable position out of contact with said tire and an extended operable position alongside a side of the tire after the wheel is turned a predetermined amount from a straight forward direction thereby to block return of the wheel to a straight position; and manually operable means to releasably secure the securing bar in extended position alongside a side of the front wheel thereby to prevent normal movement of the automobile in a straight direction, said manually operable means including a manually depressible plunger mounted on the elongate support and an opening in the securing bar registering with said depressible plunger in the extended position of said securing device for receiving said plunger and releasably holding said securing bar in extended position.

4. A locking device for an automobile for releasably holding an automobile front wheel including a tire thereon in a turned position by contact with a side of the tire to prevent normal movement of the automobile in a straight direction; said locking device comprising:

an elongate tubular support mounted on the automobile frame beneath a front door of the automobile with the longitudinal axis of the support extending in a direction toward the front wheel to be held in a turned position;

a locking bar received within said tubular support in telescoping relation for relative sliding movement between a retracted position out of contact with said tire and an extended position alongside a side of the tire after the wheel is turned a predetermined amount from a straight forward direction thereby to block return of the wheel to a straight direction; and a manually operable lock mounted adjacent said locking bar releasable locking said locking bar in said extended position thereby to prevent movement of the automobile in a straight direction, said manually operable lock having a manually depressible plunger movable to a locked position upon manual depression thereof and returned to an unlocked position upon unlocking of said lock by a manual key insertable within the lock, said locking bar having an opening therein registering with said plunger in the extended position of said locking bar for receiving said plunger thereby to lock said locking bar thereat.

5. The locking device as set forth in claim 4 wherein said tubular support has a longitudinally extending elongate slot;

and said locking bar has a detent projecting therefrom and received within said elongate slot for sliding movement between retracted and extended positions of said locking bar.

* * * * *